United States Patent [19]

Tachikawa

[11] Patent Number: 5,781,782
[45] Date of Patent: Jul. 14, 1998

[54] ELECTRONIC DEVICE WITH A POWER SAVING FUNCTION

[75] Inventor: Hirohide Tachikawa, Fujisawa, Japan

[73] Assignee: Canon Kabushiki Kaisha, Tokyo, Japan

[21] Appl. No.: 895,103

[22] Filed: Jul. 16, 1997

Related U.S. Application Data

[63] Continuation of Ser. No. 329,413, Oct. 27, 1994.

[30] Foreign Application Priority Data

Nov. 1, 1993 [JP] Japan ............... 5-273702

[51] Int. Cl.$^6$ ............... G06F 13/00; G06F 1/32
[52] U.S. Cl. ............... 395/750.07; 395/750.01
[58] Field of Search ............... 395/750.01–750.08; 364/707

[56] References Cited

U.S. PATENT DOCUMENTS

| | | | |
|---|---|---|---|
| 5,148,546 | 9/1992 | Blodgett | 395/750 |
| 5,167,024 | 11/1992 | Smith et al. | 395/375 |
| 5,247,655 | 9/1993 | Khan et al. | 395/750 |
| 5,396,635 | 3/1995 | Fung | 395/750 |
| 5,404,543 | 4/1995 | Faucher et al. | 395/750 |
| 5,497,494 | 3/1996 | Combs et al. | 395/750 |
| 5,630,163 | 5/1997 | Fung et al. | 395/307 |

*Primary Examiner*—Ayaz R. Sheikh
*Assistant Examiner*—Paul R. Myers
*Attorney, Agent, or Firm*—Fitzpatrick, Cella, Harper & Scinto

[57] ABSTRACT

An electronic device with a power saving function, capable of reducing unnecessary consumption of power and unnecessary refreshing of a DRAM, selects an appropriate power saving function in accordance with the condition of the equipment, for example beginning with supplying power, suspending operation or resuming operation.

7 Claims, 7 Drawing Sheets

FIG.7

| ROW ADDRESS WHILE REFRESHING | PHYSICAL REFRESH ADDRESS | REFRESH |
|---|---|---|
| 0000000000B<br>0000000001B<br>≀<br>1101111110B<br>1101111111B | 00000H-003FFH<br>00400H-007FFH<br>≀<br>DF800H-DFBFFH<br>DFC00H-DFFFFH | DURING ORDINARY WORKING AND SUSPENDING |
| 1110000000B<br>≀<br>1111111111B | E0000H-E03FFH<br>≀<br>FFC00H-FFFFFH | ONLY DURING ORDINARY WORKING |

ELECTRONIC DEVICE WITH A POWER SAVING FUNCTION

This application is a continuation of application Ser. No. 08/329,413 filed Oct. 27, 1994.

BACKGROUND OF THE INVENTION

1. Field of the Invention

This invention relates to an electronic device with a power saving function, in particular, one which saves power by controlling the power supply to a DRAM and a ROM.

2. Related Background Art

An electronic device, for example a computer, has various types of ROMs, for example, a ROM for storing Chinese characters, a BIOS ROM for storing programs or data, etc.

In a computer, the programs or data stored in a ROM are transferred to a DRAM and/or a RAM, and data processing is executed in accordance with the programs or data stored in the DRAM or RAM.

When power is supplied to a computer, the data stored in the ROM is transferred to the DRAM, and after the transfer, access to the ROM is prohibited. This enables the length of a word to be expanded and the access time to be reduced by using data transferred to the DRAM. These processes are generally referred to as shadow RAM technique.

In addition, information indicating a condition of the CPU, I/O device or memory is also transferred to the DRAM. By refreshing the DRAM while power to the computer is temporarily shut off, i.e. during a suspending operation, the condition of the device just prior to the suspending operation can easily be resumed when the power is again turned on, i.e. during a resuming operation.

Generally in a computer utilizing the shadow RAM technique, the ROM data is stored in the DRAM and therefore, the data in the DRAM is maintained during the suspending operation. In the past, the term "ROM data" referred only to BIOS ROM data; currently however, the meaning implied when referring to "ROM data" is both BIOS ROM data and data stored in a Chinese character ROM, which stores Chinese character font data. ROM data generally requires approximately 640 KB of memory. In prior art devices, the ROM data is copied and stored in the DRAM also.

The following problems are some of those encountered in such prior art devices:

(1) In normal operation of a prior art computer, power continues to be supplied to the ROM which is not being used, thereby increasing the consumption of power; and (2) When a suspending operation is performed, the ROM data is stored in the ROM itself, but the refreshing operation and the continuous supplying of power to the DRAM are continued, again thereby increasing the consumption of power.

SUMMARY OF THE INVENTION

An object of the present invention is to provide an electronic device having a power saving function which provides a large power saving, while avoiding any problems with data processing, by controlling power supply in response to a condition of the device with respect to a ROM and a DRAM.

One aspect of the present invention is to provide an electronic device or method including an observing step for observing a condition of transferring information from a read only memory to another memory in response to the condition of a power supply, and a power control step for cutting the power supply to the read only memory after completion of the transfer.

Another aspect of the present invention is to provide an electronic device or method including a determining step for determining whether a suspending operation is required and a power control step for controlling power supply to a read only memory in response to a request for a suspending operation after transferring information from the read only memory to another memory.

Another aspect of the present invention is to provide an electronic device or method including a determining step for determining whether a resuming operation is required and a power control step for controlling power supply to a read only memory in response to a determination that the resuming operation is required.

Another aspect of the present invention is to provide an electronic device or method including a determining step for determining whether a suspending operation or a resuming operation has been requested, and a refreshing control step for controlling refreshing of a dynamic memory which stores information from a read only memory, in accordance with a determination made in the determining step.

These and other objects, features and advantages of the invention will be more fully apparent from a consideration of the following detailed description of the preferred embodiments, taken in conjunction with the accompanying drawings.

BRIEF DESCRIPTION OF THE DRAWINGS

FIG. 7 is a diagram showing the refreshing address region for the DRAM shown in FIG. 4.

DETAILED DESCRIPTION OF THE PREFERRED EMBODIMENTS

Figure 1:
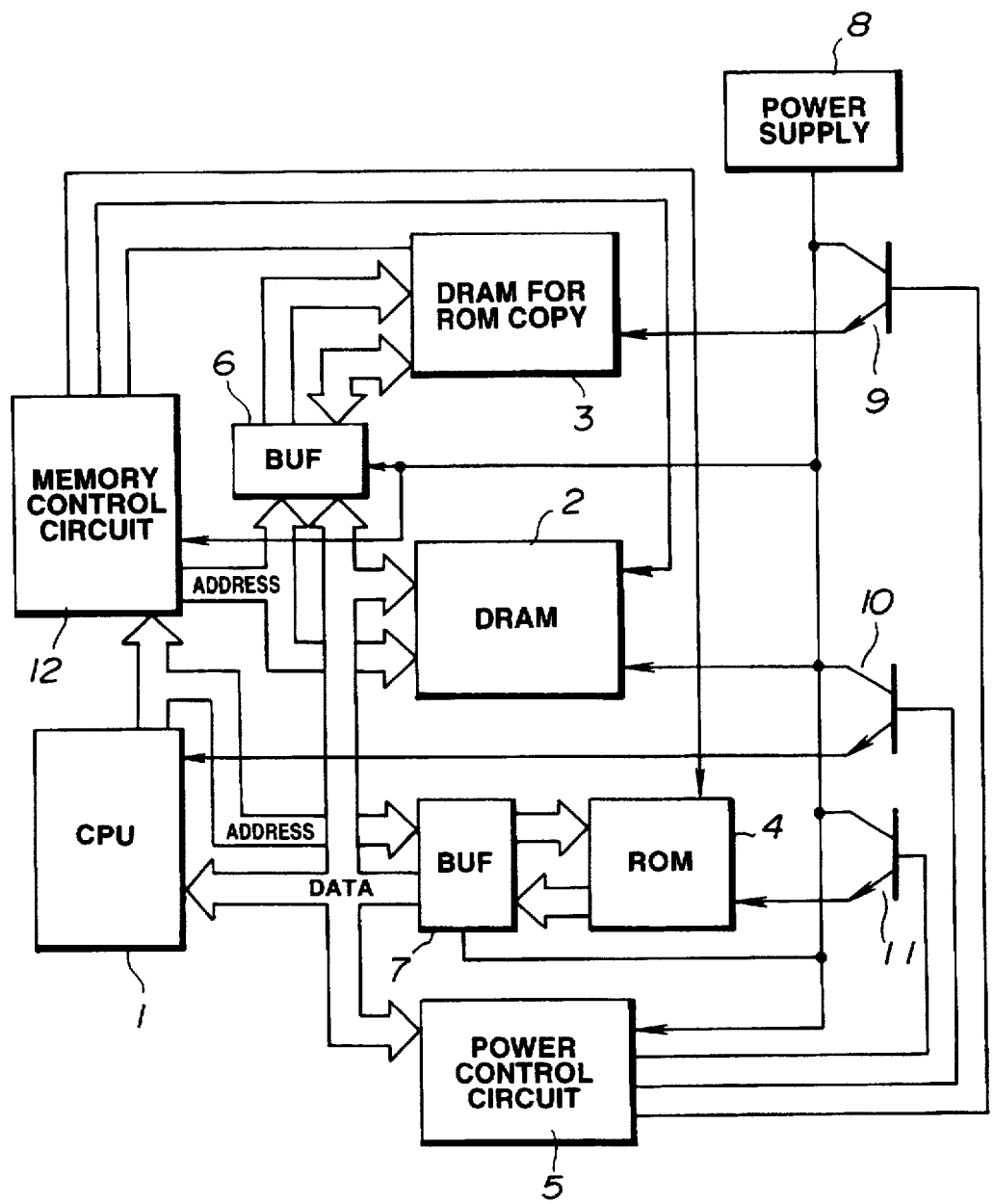
FIG. 1 is a block diagram showing a system construction according to the first embodiment.

FIG. 1 is a block diagram showing a system construction of the first embodiment.

In FIG. 1, numeral 1 denotes a CPU which controls a computer system during normal operation. Numeral 2 denotes a DRAM (for data) which can read and write data and which connects to the CPU 1. Numeral 3 denotes a DRAM for ROM copy which stores data from a ROM 4, described below, and which is connected to the CPU 1 through the buffer 6. DRAM 3 is utilized in place of ROM 4 in certain processes. Numeral 4 denotes a ROM which stores a system BIOS and Chinese character font data and is connected to the CPU 1 through a buffer 7. Numeral 5 denotes a power control circuit which alone controls power supply to each element, or, which controls the power supply in accordance with an instruction from the CPU 1. Numeral 6 denotes a twoway buffer which electrically disconnects the CPU bus, in the CPU 1, from the DRAM for ROM copy 3, when the power to the DRAM 3 is turned off. Numeral 7 denotes a reading buffer which electrically disconnects the CPU bus from the ROM 4 when the power to the ROM 4 is turned off. Numeral 8 denotes a power supply for supplying power to each device of the system shown in FIG. 1. Numeral 9 denotes a MOSFET switch which controls power supply to the DRAM 3 in accordance with a signal from the power control circuit 5. Numeral 10 denotes a MOSFET switch which controls power supply to the CPU 1 in accordance with a signal from the power control circuit 5. Numeral 11 denotes a MOSFET which controls power supply to the ROM 4 in accordance with a signal from the power control circuit 5. Numeral 12 denotes a memory control circuit which controls memories in accordance with address information and a control signal from the CPU 1.

In a system according to the first embodiment, the CPU 1, in accordance with a predetermined program or with a condition of finishing a data transfer from the ROM 4 to the DRAM 3, controls the power control circuit 5 and the memory control circuit 12 to turn off power from the power supply 8 to the ROM 4. Therefore, after finishing the transfer of a predetermined program or of data from the ROM 4 to the DRAM 3, the power supply to the ROM 4 can be restricted, thereby saving power.

In the second embodiment described in detail below, the CPU 1, in accordance with a predetermined program or with a condition of finishing data transfer from the ROM 4 to the DRAM 3, turns off the power supply from the power supply 8 to the ROM 4. In addition, the CPU 1 detects a condition of a suspending operation or a resupplying operation of the power supply 8, either cuts-off or re-supplies power to the DRAM 3, and controls the transferring of the predetermined program or data from the ROM 4 to the DRAM 3. Therefore, any unnecessary power supply to the ROM 4 is eliminated, again resulting in power savings. In addition, the provision of an unnecessary refresh cycle to the DRAM 3 is eliminated from the time of the suspending operation through the time of restarting of the power, again resulting in power savings.

The detailed operation of each element of the system in FIG. 1 will be described below.

When power is supplied to the system, the MOSFET switches 9–11 are turned on, and data stored in the ROM 4 is copied to the DRAM 3. The CPU 1 then controls the memory control unit 12 to access ROM data from the DRAM 3. Therefore, in ordinary operation, access to the ROM 4 is prevented, and, the CPU 1 transfers an instruction to the power control circuit 5 indicating the switching off of the MOSFET switch 11, and cuts off the power supply 8.

On the other hand, during a suspending operation period, the CPU 1 transfers an instruction to the power control circuit 5 which indicates turning the MOSFET switch 11 on. Therefore, power is again supplied to the ROM 4, and the CPU 1 controls the memory control circuit 12 such that ROM data access is directed to the ROM 4 instead of the DRAM 3.

Therefore, the memory control circuit 12 stops the refreshing the DRAM 3, and the CPU 1 transfers an instruction to the power control circuit 5, which indicates turning the MOSFET switch 9 off, thereby cutting off the power supply 8 to the DRAM 3.

In the resuming period, the CPU 1 transfers an instruction to the power control circuit 5 indicating the switching on of the MOSFET switch 9. After that, the CPU 1 controls the memory control circuit 12 so that the refreshing of the DRAM 3 begins. The ROM data are then copied to the DRAM 3 in the same manner as in the power supplying period, and the process continues.

By the process described above, power consumption of the ROM 4, in the usual operation, and of the DRAM 3, in the suspending period, can be reduced.

The power control operation in a computer apparatus related to this invention will now be described with reference to FIGS. 2 and 3.

Figure 2:
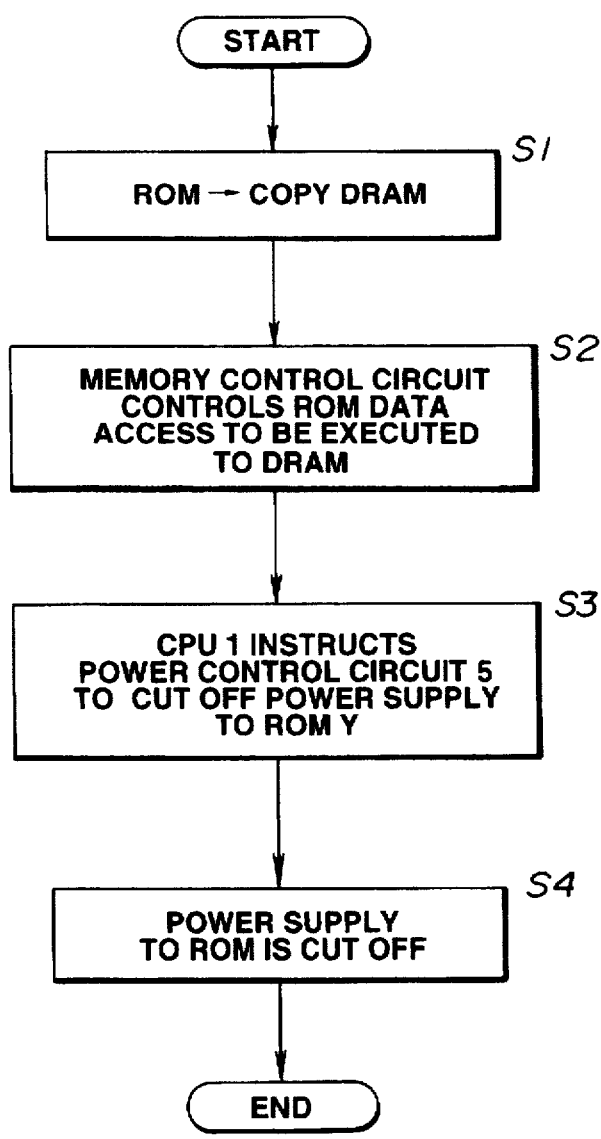
FIG. 2 is a flow chart showing a first power supply control process in a computer related to the first embodiment of the invention.

FIG. 2 is a flow chart showing a first power supply control process in a computer related to this invention. S1–S4 indicate the steps of the control process.

In step S1, a predetermined program including the power control program and/or data is transferred from the ROM 4 to the DRAM 3. In step S2, after completion of the transfer operation, the CPU 1 controls the memory control circuit 12 so that the ROM data access is executed to the DRAM 3. In step S3, the CPU 1 instructs the power control circuit 5 to cut off the power supply to the ROM 4. In step S4, the power supply to the ROM 4 is cut off, and the process is completed.

Figure 3:
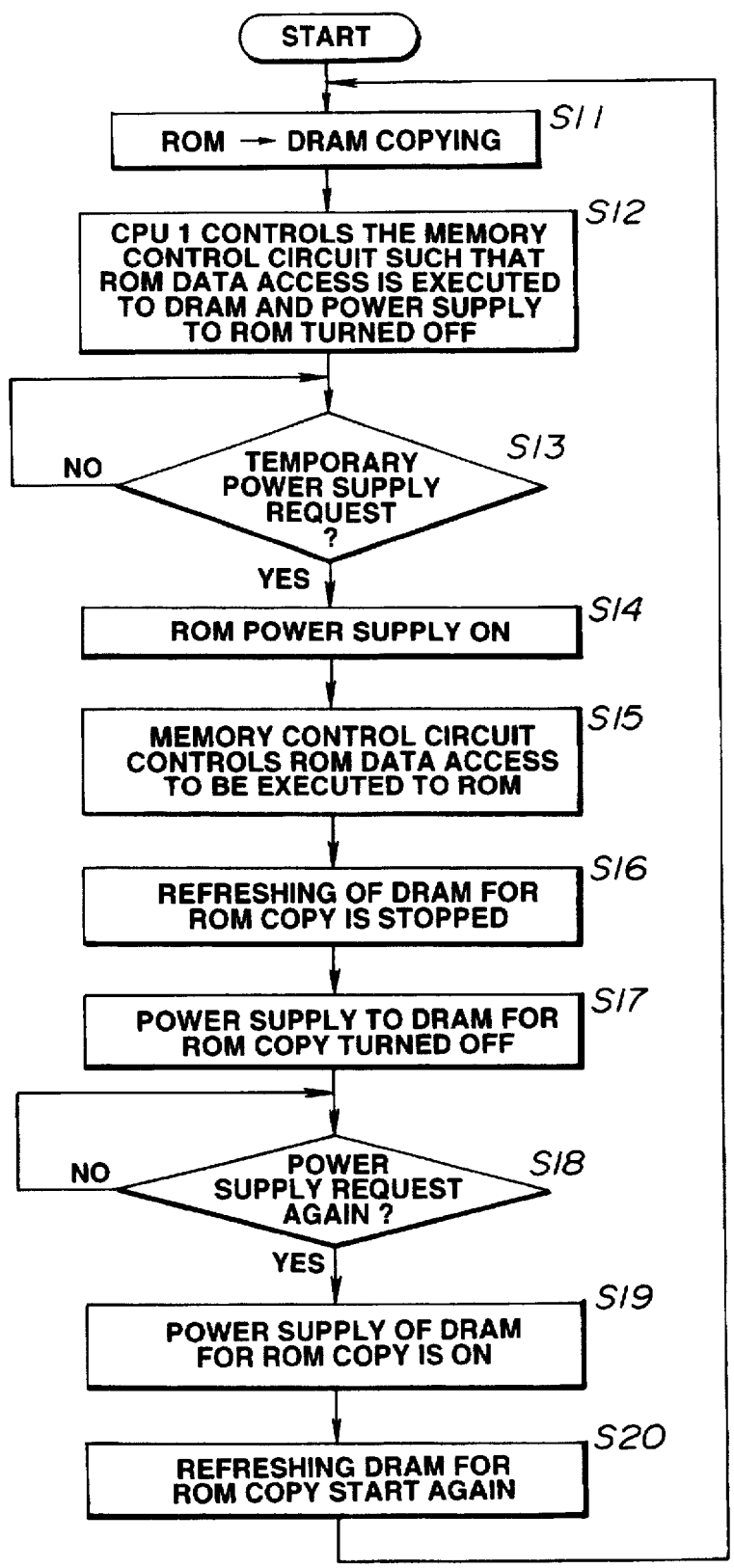
FIG. 3 is a flow chart showing a second power supply control process in a computer related to a second embodiment of the invention.

FIG. 3 is a flow chart showing a second power supply control process in a computer related to this invention. S11–S20 indicate the steps of the control process.

In step S11, a predetermined program including the power control program and/or data is transferred from the ROM 4 to the DRAM 3. In step S12, the CPU 1 controls the memory control circuit 12 so that the ROM data access is executed to the DRAM 3, and the power supply to the ROM 4 is cut off.

In step S13, the CPU 1 determines whether suspension of the power supply has been requested. If the indication in step S13 is NO, the CPU 1 maintains the current condition of the computer. If the indication in step S13 is YES, the flow advances to step S14, where the CPU 1 controls the power to be supplied to the ROM 4. In step S15, the CPU 1 controls the memory control circuit 12 so that the ROM data access is executed to the ROM 4. In step S16, the refreshing of an area of the DRAM for the ROM copy 3 is stopped. In step S17, power supply to the DRAM 3 is cut off. In step S18, the CPU 1 determines whether power supply to the DRAM 3 is required. If the indication in step S18 is NO, the CPU 1 maintains the current condition of the computer.

If the indication in step S18 is YES, the flow advances to step S19 where the CPU 1 controls power to be supplied to the DRAM 3. In step S20, the refreshing of an area of the DRAM for the ROM copy is restarted. The flow then returns to step S11.

Figure 4:
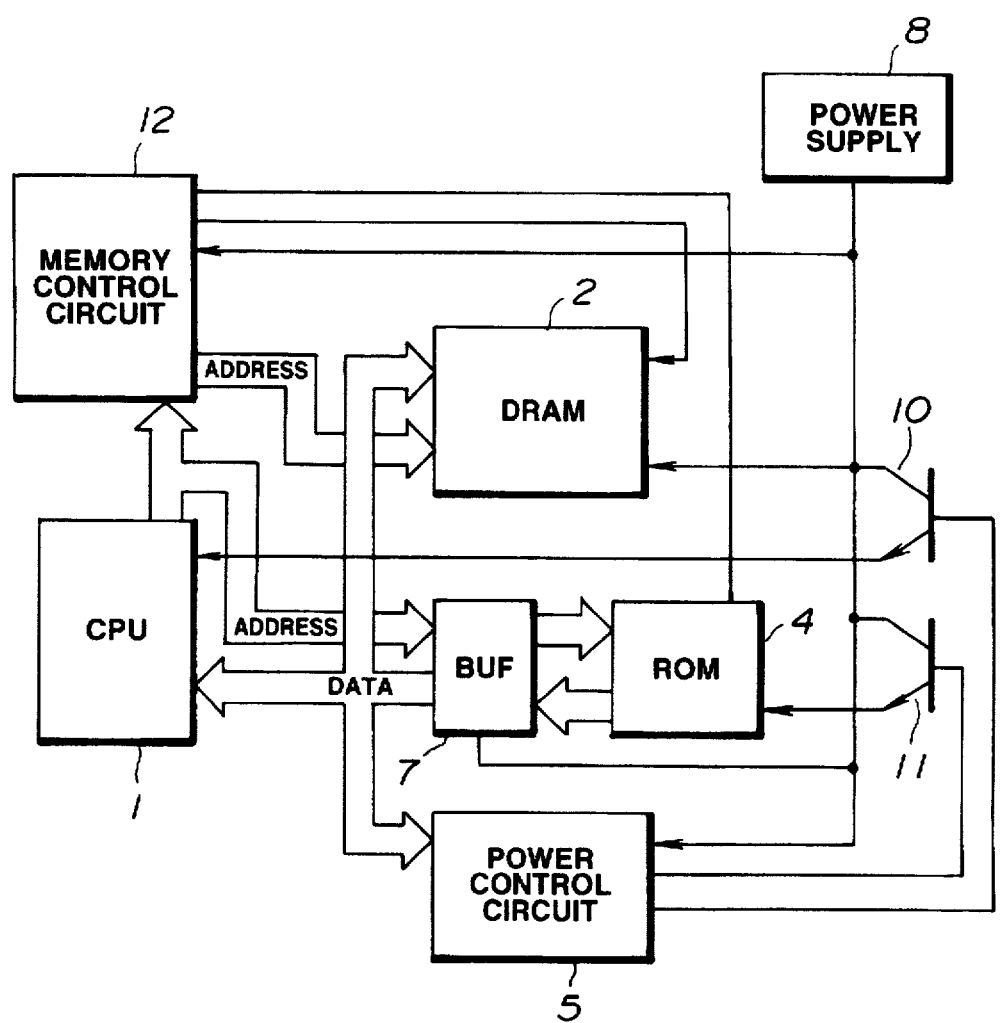
FIG. 4 is a block diagram showing a system construction according to the second embodiment.

FIG. 4 is a block diagram showing the overall system construction of the second embodiment. The reference symbols are the same as those used in FIG. 1.

The differences between FIG. 4 and FIG. 1 are that the DRAM 3, the BUF 6 and the MOSFET switch 9, shown in FIG. 1, are absent from FIG. 4, and that the DRAM 2 in FIG. 4 is utilized for both ROM copy and data storage.

In this third embodiment, the CPU 1, in accordance with a predetermined program, or upon detection of a condition of finishing data transfer from the ROM 4 to the first area of the DRAM 2, described below as the ROM copy area, cuts off the power supply from the power supply 8 to the ROM 4. In addition, the CPU 1 monitors the condition of a suspending operation or of resumption of power supply from the power supply 8, and then, the CPU 1 and the memory control circuit 12 stop refreshing of the first area of the DRAM 2 and control resumption of the transfer of a predetermined program and/or data from the ROM 4 to the first area of the DRAM 2. Therefore, any unnecessary power supply to the ROM 4 can be restricted, resulting in power savings. Furthermore, an unnecessary refresh cycle for the first area of the DRAM 3 can be restricted from the time of suspending through the time of resumption of the power, again resulting in power savings.

Figure 5:
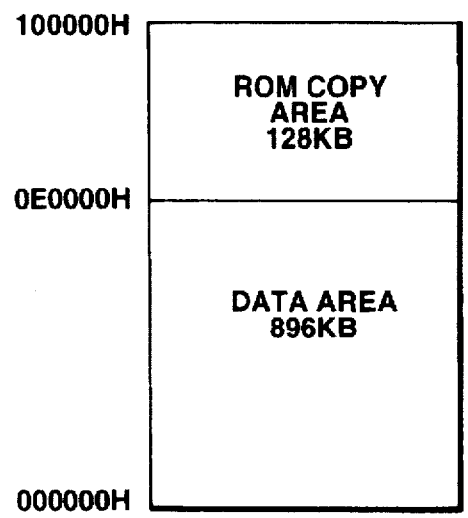
FIG. 5 is a memory map of the DRAM shown in FIG. 4.

FIG. 5 is a memory map of the DRAM shown in FIG. 4. The DRAM 2 has a first area for ROM copy and a second area for data so that a number of elements can be reduced. In this embodiment, the DRAM 2 with 1M bytes of area has a data area occupying the lower 896K bytes (corresponding to physical address 00000H–DFFFFH) and a ROM copy area in the upper 128K bytes (corresponding to physical address E0000H–FFFFFH).

Furthermore, the DRAM 2 in FIG. 5 physically has a 1M (1M×1 bit, 1M×4 bits, etc.) address space. Data access to the DRAM 2, with 1M byte areas, is executed every 10 bits and in two times for a row address and column address.

In a refreshing operation, 10 bit row addresses are designated and data of all columns corresponding to the designated row address are refreshed (RAS only refresh).

Figure 6:
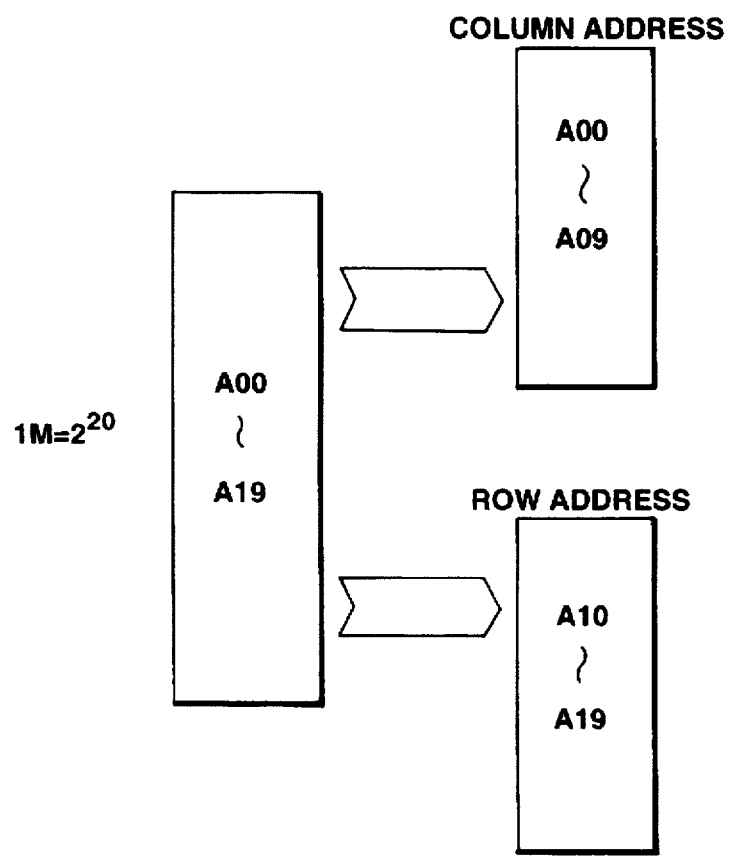
FIG. 6 is a diagram showing the allocation of row addresses to the DRAM shown in FIG. 4.

As described above, designating 1024 refresh addresses, from "0000000000B" to "1111111111B", in a predetermined time, refreshes all memory areas, assuming that row address and column address are divided as shown in FIG. 6.

When power is supplied, the MOSFET switches 10 and 11, shown in FIG. 2, are turned ON. The CPU 1 then transfers the ROM data from the ROM 4 to the area of the DRAM 2 for ROM copy. After completion of the copying, the CPU 1 controls the memory control circuit 12 so that all ROM data accessed after that time are directed to the ROM copy area of the DRAM 2.

As a result, in regular operation, access to the ROM 4 is not executed and therefore, the CPU 1 transfers an instruction to the power control circuit 5 so that the MOSFET switch 11 is turned off and power supply to the ROM 4 is cut off.

On the other hand, after a suspending period, the CPU 1 transfers an instruction to the power control circuit 5 so that the MOSFET switch 11 is turned ON, which enables the ROM 4 to be activated. The CPU 1 then controls the memory control circuit 12 so that all ROM data access from that time is directed to the ROM 4 instead of the DRAM 2. Furthermore, the CPU 1 controls the memory control circuit 12 so that refreshing of the DRAM 2 stops only for the area for ROM copy. This control is executed by outputting row addresses (from "00000000000B" to "1101111111B") as shown in FIG. 7 instead of outputting row addresses (from "00000000000B" to "1111111111B") for refreshing as in usual operation.

As described above, the number of adresses required for the refreshing cycle can be reduced from 1024 to 896, thereby reducing power consumption.

In a resuming period, the CPU 1 controls the memory control circuit 12 so that a refreshing operation for the ROM copy area is resumed. After the resuming period, the ROM data are copied in the same manner as in the power supplying period, and the process restarts.

As described above, power consumption by the ROM 4 in regular operation and by the DRAM 2 during refreshing, can be reduced.

In addition, selecting row addresses A0–A6 and A17–A19 is desirable because selecting row addresses A10–A19 causes the DRAM 2 to use a page mode access function, which is unnecessary and inefficient in this instance.

The third power supply control process will now be described, with reference to FIG. 8.

Figure 8:
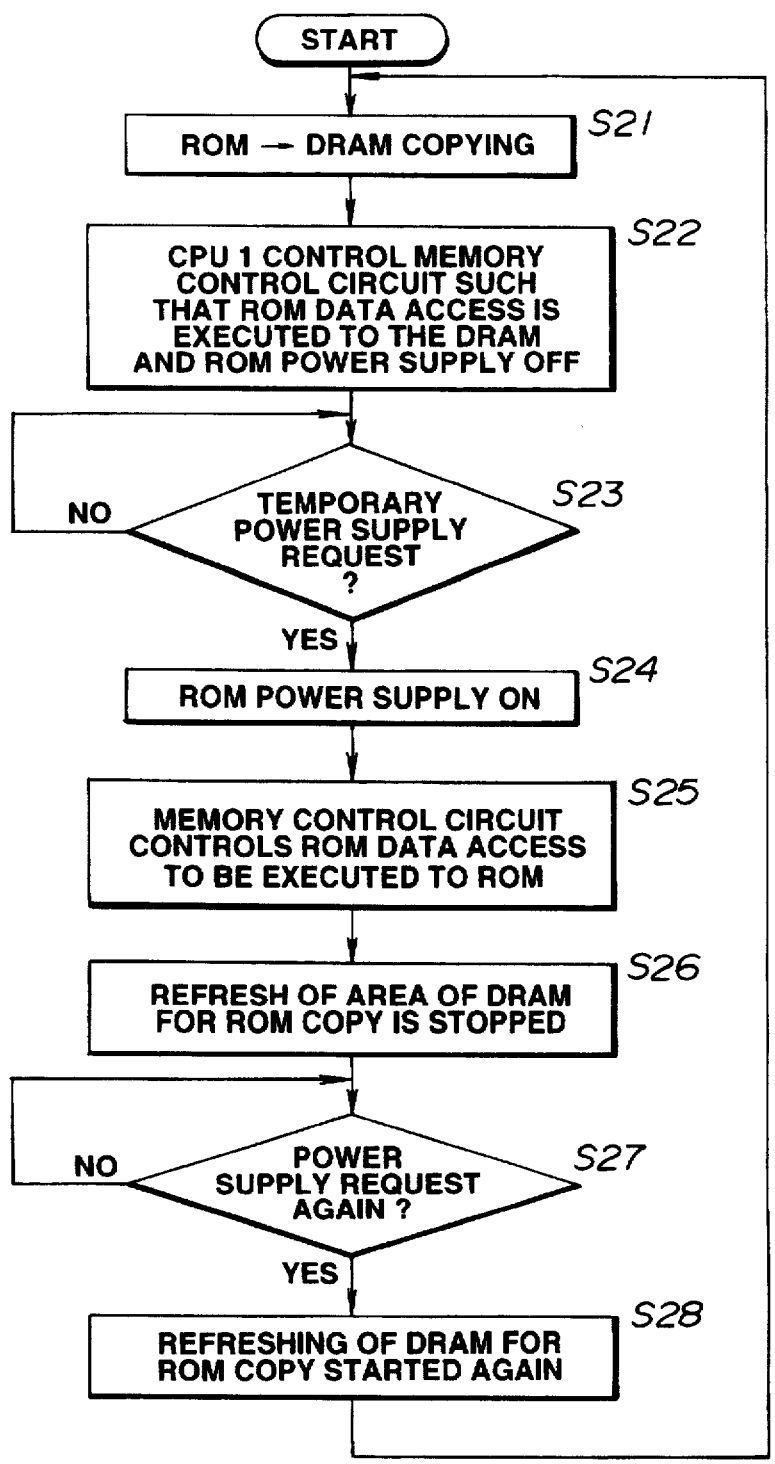
FIG. 8 is a flow chart showing a third power supply control process in a computer related to the second embodiment of the invention.

FIG. 8 is a flow chart showing a third power supply control process in a computer related to this invention. S21–S28 indicate the steps of the control process.

In step S21, a predetermined program including the power control program and/or data is transferred from the ROM 4 to the DRAM 2. In step S22, the CPU 1 controls the memory control circuit 12 so that ROM data access is directed to the DRAM 3, and power supply to the ROM 4 is cut off.

In step S23, the CPU 1 determines whether suspension of power supply has been requested. If the indication in step S23 is NO, the CPU 1 maintains the current condition of the computer. If the indication in step S23 is YES, the flow advances to step (4), where the CPU 1 controls power to be supplied to the ROM 4. In step S25, the CPU 1 controls the memory control circuit 12 so that the ROM data access is directed to the ROM 4. In step S26, the refreshing of an area of the DRAM 3 for ROM copy is stopped. In step S27, the CPU 1 determines whether power supply to the DRAM 3 is required. If the indication in step S27 is NO, the CPU 1 maintains the current condition of the computer. If the indication in step S27 is YES, the flow advances to step S28, where the refreshing of an area of the DRAM for the ROM copy 3 is restarted and the flow returns to step S21.

As described above, the present invention provides an electronic device with a power saving function which enables the device to save power without affecting the data processing, by controlling a power supply based on monitoring of access requests of a ROM and a DRAM.

The present invention also provides an electronic device and method that include monitoring the transfer of information from a read only memory to another memory, after power is supplied, and controlling the power so as to cut the power supply to the read only memory after the completion of the transfer process.

The present invention also provides an electronic device and method that include determining whether a suspending operation is requested and controlling power supply to a read only memory in response to request for suspension after transferring information from the read only memory to another memory.

The present invention also provides an electronic device and method that include determining whether a resuming operation is requested and controlling power supply to a read only memory in response to the request for resuming.

The present invention also provides an electronic device and method that include determining whether a suspending or a resuming operation is requested and controlling refreshing of a dynamic memory which stores information from a read only memory in accordance with a result of the determination step.

What is claimed is:

1. In an electronic information processing apparatus with a power saving function:
   random access memory means for receiving information which has been read out from a read only memory, and storing that information; and
   power control means for cutting off power being supplied to the read only memory in response to the transfer of the information and in response to power-on and for providing power to the read only memory in response to a request for suspending of operation.

2. An electric device according to claim 1, further comprising an executing means for executing operations based on the information in said random access memory means, after transfer of the information in the read only memory to said random access memory means.

3. An electric device according to claim 1, wherein said power control means cuts power to said random access memory means in accordance with a request for suspending of operation.

4. An electric device according to claim 1, wherein said power control means cuts power to the read only memory in response to a request for resuming power supply, after a suspension of power supply to the read only memory.

5. An electric device according to claim 1, wherein said random access memory means comprises a dynamic memory.

6. In an electronic information processing apparatus:
a read only memory for memorizing predetermined information;
random access memory means for reading out and memorizing information from said read only memory; and
power control means for controlling the cutting of power to said read only memory in response to power-on and to transfer of the information in said read only memory to said random access memory means and for providing power to the read only memory in response to a request for suspending of operation.

7. An information processing apparatus according to claim 6, further comprising a control means and an execution means, wherein said control means controls said execution means so as to execute an operation according to the predetermined information, by accessing said random access memory means, after transfer of the information in said read only memory to said random access memory means.

* * * * *

UNITED STATES PATENT AND TRADEMARK OFFICE
CERTIFICATE OF CORRECTION

PATENT NO. : 5,781,782
DATED : July 14, 1998
INVENTOR(S) : Hirohide Tachikawa

It is certified that error appears in the above-identified patent and that said Letters Patent is hereby corrected as shown below:

COLUMN 3
  Line 5, "twoway" should read --two-way--;
  Line 37, "cuts-off" should read --cuts off--;
  Line 63, "stops the" should read --stops--.

COLUMN 5
  Line 32, "FIG 2," should read --FIG. 4,--.

Signed and Sealed this

Fourth Day of May, 1999

Attest:

Attesting Officer

Q. TODD DICKINSON

Acting Commissioner of Patents and Trademarks